(12) United States Patent
Rosvall et al.

(10) Patent No.: US 8,034,227 B2
(45) Date of Patent: Oct. 11, 2011

(54) CHEMICAL PROCESS

(75) Inventors: Magnus Rosvall, Ytterby (SE); Rolf Edvinsson Albers, Partille (SE)

(73) Assignee: Akzo Nobel N.V., Arnhem (NL)

( * ) Notice: Subject to any disclaimer, the term of this patent is extended or adjusted under 35 U.S.C. 154(b) by 1059 days.

(21) Appl. No.: 11/476,894

(22) Filed: Jun. 29, 2006

(65) Prior Publication Data

US 2007/0012579 A1    Jan. 18, 2007

Related U.S. Application Data (60) Provisional application No. 60/694,981, filed on Jun. 30, 2005.

(51) Int. Cl.
*C25B 1/26* (2006.01)

(52) U.S. Cl. ......... 205/503; 205/466; 205/468; 204/252

(58) Field of Classification Search ............... 205/466, 205/468, 474, 566; 204/95, 101, 252, 283, 204/284; 423/472, 477, 478
See application file for complete search history.

(56) References Cited

U.S. PATENT DOCUMENTS

| | | | |
|---|---|---|---|
| 2,904,478 A | 9/1959 | Muller | |
| 3,884,777 A | 5/1975 | Harke et al. | |
| 4,067,787 A | 1/1978 | Kastening et al. | |
| 4,515,664 A | 5/1985 | Korach | |
| 5,296,108 A * | 3/1994 | Kaczur et al. ............ | 205/556 |
| 5,419,818 A | 5/1995 | Wanngard | |
| 5,961,948 A | 10/1999 | Wanngard | |
| 5,972,305 A | 10/1999 | Park et al. | |
| 6,322,690 B1 | 11/2001 | Hammer-Olsen et al. | |
| 6,524,547 B1 | 2/2003 | Nystrom et al. | |
| 2003/0019758 A1 | 1/2003 | Gopal | |
| 2005/0009207 A1* | 1/2005 | Vos et al. ............ | 438/1 |
| 2007/0012578 A1* | 1/2007 | Edvinsson Albers et al. | 205/466 |
| 2008/0317662 A1* | 12/2008 | Doherty ............ | 423/588 |

FOREIGN PATENT DOCUMENTS

| | | |
|---|---|---|
| JP | 61-284591 | 12/1986 |
| KR | 100341886 | 6/2002 |
| RU | 2 069 170 | 11/1996 |
| RU | 2 131 395 | 6/1999 |
| RU | 2 154 125 | 8/2000 |
| RU | 2 196 106 | 1/2003 |
| WO | WO 02/02846 A2 | 1/2002 |
| WO | WO 03/004727 A2 | 1/2003 |

(Continued)

OTHER PUBLICATIONS

International Search Report, completed Nov. 15, 2006.

(Continued)

*Primary Examiner* — Kaj K Olsen
*Assistant Examiner* — Susan Thai
(74) *Attorney, Agent, or Firm* — Kenyon & Kenyon LLP (57) ABSTRACT

The invention relates to a process for the production of alkali metal chlorate comprising:
providing an electrochemical cell comprising an anode and a cathode in separate anode and cathode compartments;
contacting the cathode with an electrolyte comprising at least one organic mediator and one or more organic or mineral acids;
reacting the organic mediator at the cathode to form at least one reduced form of the mediator;
reacting the at least one reduced form of the mediator with oxygen to form hydrogen peroxide;
contacting the anode with an anolyte comprising alkali metal chloride;
reacting chloride at the anode to form chlorine that is hydrolyzed; and,
reacting the hydrolyzed chlorine to form chlorate.

18 Claims, 2 Drawing Sheets

FOREIGN PATENT DOCUMENTS

WO WO 2004/005583 A1 1/2004
WO 2006/003395 1/2006

OTHER PUBLICATIONS

Chhikara et al, "Oxidation of alcohols with hydrogen peroxide catalyzed by a new imidazolium ion based phosphotungstate complex in ionic liquid", Journal of Catalysis, 230, (2005).

Gyenge et al, "Electrosynthesis of hydrogen perioxide in acidic solutions by mediated oxygen reduction in a three-phase (aqueous/organic/gaseous) system . . ." Journal of Appli, (2003).

Gyenge et al, "Electrosynthesis of hydrogen perioxide in acidic solutions by mediated oxygen reduction in a three-phase (aqueous/organic/gaseous) Part II . . ." Journal of Appli, (2003).

Huissoud et al, "Electrochemical reduction of 2-ethyl-9,10-anthraquinone on reticulated vitreous carbon and mediated formation of hydrogen peroxide", Journal of Applied Electr, (1998).

Kalu et al, "Simultaneous electrosynthesis of alkaline hydrogen perioxide and sodium chlorate", Journal of Applied Electrochemistry 20 (1990) 932-940.

Mirkhalaf et al, "Substituent effects on the electrocatalytic reduction of oxygen on quinone-modified glassy carbon electrodes", Phys. Chem. Chem. Phys., 2004, 6, 1321-1327.

Tang et al, "Electrosynthesis of hydrogen peroxide in room temperature ionic liquids and in situ epoxidation of alkenes", Chem. Commun., 2005, 1345-1347.

Tatsumi et al, "Mechanistic study of the autoxidation of reduced flavin and quinone compounds", Journal of Electroanalytical Chemistry 443 (1998) 236-242.

Vaik et al, "Electrochmical reduction of oxygen on anodically pretreated and chemically grafted glassy carbon electrodes in alkaline solutions", Electrochemistry Communicatio, Oct. 24, 2003.

Vaik et al, "Oxygen reduction on phenanthrenequinone-modified glassy carbon electrodes in 0.1 M KOH", Journal of Electroanalytical Chemistry 564 (2004) 159-166.

\* cited by examiner

CHEMICAL PROCESS

This application claims priority from U.S. Provisional Application No. 60/694,981, filed on Jun. 30, 2005.

The present invention relates to a process for the production of alkali metal chlorate in a divided electrochemical cell.

Alkali metal chlorate, and especially sodium chlorate, is an important chemical, particularly in the pulp and paper industry as a raw material for the production of chlorine dioxide that is widely used for bleaching. Alkali metal chlorate is conventionally produced by electrolysis of alkali metal chlorides in open non-divided electrolytic cells provided with hydrogen evolving cathodes. The overall chemical reaction taking place in such cells is $$MCl + 3H_2O \rightarrow MClO_3 + 3H_2$$

where M is an alkali metal. The process is very efficient although the hydrogen gas evolved at the cathode create some over-voltage increasing the power consumption.

Hydrogen peroxide is also widely used in the pulp and paper industry and is generally produced by the anthraquinone process involving alternate hydrogenation and oxidation of anthraquinones and/or tetrahydro anthraquinones in a working solution. Although very efficient, this process is complicated to operate and requires extensive equipment. Alternative processes have so far not been proved competitive unless under very special circumstances.

WO 2004/005583 discloses production of alkali metal chlorate in an electrolytic cell divided by a cation selective separator into an anode compartment in which an anode is arranged and a cathode compartment in which a gas diffusion electrode is arranged. Oxygen is introduced to the cathode compartment and electrolysed to produce alkali metal hydroxide.

Electrochemical production of alkaline hydrogen peroxide solution by reducing oxygen on a cathode is disclosed in e.g. U.S. Pat. No. 6,322,690.

Electrochemical production of alkaline hydrogen peroxide solution by reducing oxygen on a cathode and simultaneous production of sodium chlorate is disclosed in E. E. Kalu and C. Oloman, "Simultaneous electrosynthesis of alkaline hydrogen peroxide and sodium chlorate", Journal of Applied Electrochemistry 20 (1990), 932-940.

E. L. Gyenge and C. W. Oloman disclose in "Electrosynthesis of hydrogen peroxide in acidic solutions by mediated oxygen reduction in a three-phase (aqueous/organic/gaseous) system Part I: Emulsion structure, electrode kinetics and batch electrolysis", Journal of Applied Electrochemistry (2003), 33(8), 655-663 and "Electrosynthesis of hydrogen peroxide in acidic solutions by mediated oxygen reduction in a three-phase (aqueous/organic/gaseous) system. Part II: Experiments in flow-by fixed-bed electrochemical cells with three-phase flow", Journal of Applied Electrochemistry (2003), 33(8), 665-674, production of hydrogen peroxide by electroreduction of 2-ethyl-9,10-anthraquinone to the corresponding anthrahydroquinone dissolved in an organic phase emulsified in water. The anthrahydroquinone is reacted with gaseous oxygen to obtain hydrogen peroxide.

JP 61-284591 and U.S. Pat. No. 4,067,787 disclose production of hydrogen peroxide by reduction of a water soluble anthraquinone derivate in an aqueous solution followed by reaction with oxygen.

A. Huissoud and P. Tissot disclose in "Electrochemical reduction of 2-ethyl-9,10-anthraquinone on reticulated vitreous carbon and mediated formation of hydrogen peroxide" Journal of Applied Electrochemistry (1998), 28(6), 653-657, electrochemical reduction of 2-ethyl-9,10-anthraquinone in dimethoxyethane comprising 5% water and 0.1 mole/liter of tetraetyl ammonium tetrafluoroborate.

Electrochemical reduction of oxygen on a carbon cathode grafted with anthraquinone is disclosed in e.g. WO 02/02846, Mirkhalaf, Fakhradin; Tammeveski, Kaido; Schiffrin, David J., "Substituent effects on the electrocatalytic reduction of oxygen on quinone-modified glassy carbon electrodes", Phys. Chem.Chem.Phys.(2004), 6(6), 1321-1327, and Vaik, Katri; Schiffrin, David J.; Tammeveski, Kaido; "Electrochemical reduction of oxygen on anodically pre-treated and chemically grafted glassy carbon electrodes in alkaline solutions", Electrochemistry Communications (2004), 6(1), 1-5.

Vaik, Katri; Sarapuu, Ave; Tammeveski, Kaido; Mirkhalaf, Fakhradin; Schiffrin, David J. "Oxygen reduction on phenanthrenequinone-modified glassy carbon electrodes in 0.1 M KOH", Journal of Electroanalytical Chemistry (2004), 564 (1-2), 159-166, discloses use of a cathode grafted with phenanthrenequinone.

WO 03/004727 discloses electrosynthesis of organic compounds by electrochemical transformation of a compound in the presence of an electrolyte comprising a room temperature ionic liquid and recovering the product.

It is an object of the invention to provide an efficient process for the production of alkali metal chlorate.

It is another object of the invention to provide a process enabling simultaneous production of alkali metal chlorate and hydrogen peroxide.

BRIEF DESCRIPTION OF THE DRAWINGS

For a fuller understanding of the invention, the following description should be read in conjunction with the drawings, wherein.

The invention concerns a process for the production of alkali metal chlorate comprising:

providing an electrochemical cell comprising an anode and a cathode in separate anode and cathode compartments;

contacting the cathode with a catholyte comprising at least one organic mediator and one or more organic or mineral acids;

reacting the organic mediator at the cathode to form at least one reduced form of the mediator;

reacting the at least one reduced form of the mediator with oxygen to form hydrogen peroxide;

contacting the anode with an anolyte comprising alkali metal chloride;

reacting chloride at the anode to form chlorine that is hydrolysed; and, reacting the hydrolysed chlorine to form chlorate.

Preferably the hydrogen peroxide is separated from the catholyte as a product or used as a reactant for the production of other chemicals without separation from the electrolyte. However, in the case hydrogen peroxide is not needed at the production site it is also possible simply to destruct the hydrogen peroxide, for example by catalytic decomposition.

The anolyte may have a concentration of chloride ions up to saturation, preferably from about 30 to about 300 g/l, more preferably from about 50 to about 250 g/l, most preferably from about 80 to about 200 g/l, calculated as sodium chloride. The anolyte usually also comprise at least some chlorate, preferably from about 1 to about 1200 g/l, calculated as sodium chlorate. In one embodiment the preferred content is from about 300 to about 650 g/l, most preferably from about 500 to about 650 g/l, calculated as sodium chlorate. In another embodiment the preferred content is from about 1 to about 50 g/l, most preferably from about 1 to about 30 g/l, calculated as sodium chlorate.

In order to stimulate the hydrolysis of chlorine the pH in the bulk of the anolyte is preferably at least about 4, most preferably from about 4 to about 10. It is to be understood that there may be local variations of the pH and particularly that there may be local zones having considerably lower pH as protons are formed.

In order to suppress undesired side reaction it is possible to include alkali metal chromate, dichromate or another suitable pH buffer into the anolyte. If chromate or dichromate is present in the anolyte the content thereof is preferably from about 0.01 to about 10 g/l, most preferably from about 0.01 to about 6 g/l, calculated as sodium chromate. However, it is also possible to operate in the substantial absence of chromate in the anolyte.

Unless otherwise stated, all concentrations in g/l refer to the volume of the actual solution.

The temperature of the anolyte is preferably from about 20 to about 100° C., most preferably from about 40 to about 90° C.

Suitably, most of the chlorine generated in the anode compartment is dissolved in the anolyte solution. Dissolved chlorine spontaneously undergoes partial hydrolysis to form hypochlorous acid according to the formula:

$Cl_2 + H_2O \rightarrow HClO + HCl$

The hypochlorous acid undergoes disproportionation (in some literature referred to as autoxidation) to chlorate according to the overall formula:

$2\ HClO + ClO^- \rightarrow ClO_3^- + 2\ Cl^- + 2\ H^+$

The disproportionation may take place in the cell, in a separate chlorate reactor or a combination thereof.

Preferably, anolyte from the anode compartment, also referred to as chlorate electrolyte and usually comprising chlorine and/or hypochlorous acid, is brought to a chlorate reactor for proceeding with the disproportionation reactions to produce chlorate. The chlorate reactor may be of any conventional kind, for example as described in U.S. Pat. No. 5,419,818, and may comprise one or several chlorate vessels.

When the disproportionation is completed to a sufficient degree the chlorate electrolyte may be brought to a crystalliser for precipitating and withdrawing solid alkali metal chlorate. The mother liquor from the crystallisation, usually containing unreacted chloride ions, hypochlorite, and chlorate, is then preferably recirculated to the anode compartment of the electrochemical cell to form an anolyte together with freshly added alkali metal chloride. It is also possible to use the chlorate electrolyte as such without crystallisation, for example as a feed to a chlorine dioxide generator. This embodiment is advantageous in an integrated process where depleted generator liquor from the chlorine dioxide production is recycled back to the anode compartment of the electrochemical cell for the chlorate production.

The production of alkali metal chlorate may be performed continuously, batchwise or a combination thereof.

The organic mediator in the catholyte is preferably dissolved in a predominantly aqueous or a predominantly organic continuous liquid phase, preferably having an electrical conductivity under process conditions of at least about 0.1 S/m, more preferably at least about 1 S/m, most preferably at least about 3 S/m. However, it is also possible for the organic mediator to be dissolved in a predominantly organic phase emulsified in a continuous predominantly aqueous phase.

The organic mediator is a substance capable of being electrochemically reacted at a cathode to yield one or several reduced forms, which in turn are capable of reacting with preferably molecular oxygen and be converted back to the original form, thus enabling a cyclic process. The reaction of the reduced forms of the mediator with oxygen preferably take place in the presence of protons. However, in the absence of a suitable proton source it is possible to form peroxide salts, for example $Na_2O_2$, which subsequently may be hydrolyzed to yield hydrogen peroxide. Without being bound to any theory it is believed that the reaction scheme yielding hydrogen peroxide comprises the transfer of two electrons and two protons taking place in separate or combined simultaneous reactions and is believed to involve as intermediate species $O_2^-$, HOO—, and HOO$^-$.

Examples of classes of organic substances forming redox systems and useful as mediators include quinones, flavoquinones, pyridine derivates such as nicotineamides, and ketones.

Useful quinones include molecules containing a (benzo) quinone-moiety (orto- or para-forms), of which anthraquinones, tetrahydro anthraquinones, naphtoquinones, benzoquinones and derivates thereof are preferred. Anthraquinones, naphtoquinones and benzoquinones are preferably substituted, for example alkyl substituted like 2-alkyl-9,10-anthraquinones. Specific examples include 2-ethyl-9,10-anthraquinone, 2-tert-butyl-9,10-anthraquinone, 2-hexenyl-9,10-anthraquinone, eutectic mixtures of alkyl-9,10-anthraquinones, mixtures of 2-amyl-9,10-anthraquinones, all of which having high stability. Specific examples of alkyl substituted napthoquinones include 2-methyl-1,4-naphthoquinone, 2-ethyl-1,4-naphthoquinone, 2-propyl-1,4-naphthoquinone, 2-tert-butyl-1,4-naphthoquinone, 2-tert-amyl-1,4-naphthoquinone, 2-iso-amyl-1,4-naphthoquinone, 2,3-dimethyl-1,4-naphthoquinone. Other examples of substituents useful for controlling reactivity and solubility of quinones include —$SO_3H$/—$SO_3^-$, —$PO_2R^-$, —$OPO_2R^-$, —$NO_2$, —$OCH_3$, —$SO_2CH_3$, —OPh, —SPh, —$SO_2Ph$, —COOH/—COO$^-$, —CN, —OH, —$COCH_3$, —F, —Cl, —Br, —$CF_3$, —$NH_2$/—$NH_3^+$, —NRH/—$NRH_2^+$, —$NR_2$/—$NR_2H^+$, —$NR_3^+$, —$PH_2$/—$NH_3^+$, —$SR_2^+$, —PRH/—$PRH_2^+$, —$PR_2$/—$PR_2H^+$ and —$PR_3^+$, R preferably being, independently of each other, optionally substituted alkyl, alkenyl or aryl, or hydrogen. Anthraquinones may be singly or multiply substituted with a combination of the above and/or other substituents. It is also possible to use quinone derivates having common charge bearing substituents imposing an ionic character of the molecule. Specific examples of non-alkyl substituted quinones derivates include anthraquinone-2-sulfonate, 5,6,7,8-tetrahydro-9-10-anthraquinone-2-sulfonate, anthraquinone-2,6-disulfonate, naphthoquinone-2-sulfonate, 2-methoxy-1,4-naphthoquinone, 2-ethoxy-1,4-naphthoquinone, 2-amino-anthraquinone, 2-amino-naphtoquinone, 2-(alkyl amino)-anthraquinone, 2-(dialkyl amino)-anthraquinone, 2-(trialkyl ammonium)-anthraquinone, 2-(alkyl amino)-naphtoquinone, 2-(dialkyl amino)-naphtoquinone, 2-(trialkyl ammonium)-naphtoquinone. Naphtoquinones may, e.g. be substituted at any position on the lateral ring, e.g. naphtoquinone-6-sulphonate or 6-trialkylammonium naphtoquinone. One substituent on each ring can also be advantageous, such as 6-amyl-naphtoquinone-2-sulphonate or 6-ethyl-2-triethylammonium naphtoquinone. Corresponding examples for benzoquinone are benzoquinone-2-sulphonate and 2-(ethyl,dimethyl)ammonium. Anthraquinones and naphtoquinones with the lateral rings partially hydrogenated, e.g. 1,2,3,4-tetrahydro anthraquinone, 5,6,7,8-tetrahydro-2-ethyl-anthraquinone, 5,6,7,8-tetrahydronaphtoquinone, could also be used. This also applies to substituted anthra- and naphto-quinones, including those corresponding to the kinds mentioned above.

In the case a quinone is substituted and comprise one or more optionally substituted alkyl, alkenyl or aryl groups, it is preferred that these groups independently from each others, have from 1 to 12 carbon atoms, most preferably from 1 to 8 carbon atoms. If of more than one such group is present, they are preferably of mixed chain length. Alkyl, alkenyl and aryl groups may also be substituted, e.g. with one or more hydroxyl group.

Quinones, including anthraquinones, tetrahydro anthraquinones, naphtoquinones, benzoquinones and derivates thereof, can be reduced to corresponding hydroquinones by successive addition of two electrons and two protons. Next to the quinone and the hydroquinone a number of intermediate forms are believed to be present and active, like the semi-quinone radical and the semiquinone anion, as well as the base forms of the acidic hydroquinone. All these reduced forms may react with oxygen and contribute to the overall reaction yielding hydrogen peroxide and the original quinone.

Other mediator systems capable of reducing oxygen to superoxide and subsequently hydrogen peroxide include flavoquinones, e.g. flavin (see e.g. H. Tatsumi et al in "Mechanistic study of the autooxidation of reduced flavin and quinone compounds" in Journal of Electroanalytical Chemistry (1998), 443, 236-242) and pyridine derivates like nicotinamide and derivates thereof.

Further mediator systems are formed by ketones and their corresponding alcohols. The ketone can be electrochemically reduced to the corresponding alcohol, which reacts with oxygen to form hydrogen peroxide and the original ketone. Secondary alcohols are preferred and particularily phenylic ones. Useful alcohols include isopropyl alcohol, benzyl alcohol, diphenylmethanol, methylphenylmethanol. Secondary alcohols also containing a charge bearing group can also be used.

The content of organic mediator, including the reduced forms, in the catholyte is preferably at least about 0.1 wt %, more preferably at least about 1 wt %, most preferably at least about 3 wt %. It is limited upwards only by the solubility, which depends on the mediator used and the composition of the liquid phase, but in many cases may be as much as about 10 wt % or about 20 wt % or even higher. In an embodiment where a significant part of the hydrogen peroxide is formed outside the cell the content of organic mediator is preferably at least about 1 wt % to, more preferably at least about 3 wt %, most preferably at least about 10 wt %.

If the catholyte comprises a predominantly aqueous continuous phase dissolving the organic mediator, this phase preferably comprises at least about 50 wt %, most preferably at least about 80 wt % water and other inorganic components. It is then preferred that the mediator is selected from those with high solubility in water, for example quinones comprising one or more hydrophilic group such as —$SO_3H$/—$SO_3^-$, —$NO_2$, —COOH/—$COO^-$, —OH, —$NH_2$/—$NH_3^+$, —NRH/—$NRH_2^+$, —$NR_2$/—$NR_2H^+$, —$NR_3^+$, —$PH_2$/—$NH_3^+$, —PRH/—$PRH_2^+$, —$PR_2$/—$PR_2H^+$ and —$PR_3^+$, R preferably being, independently of each other, hydrogen or optionally substituted alkyl or alkenyl.

If the catholyte comprises a predominantly organic continuous phase dissolving the organic mediator, this phase preferably comprises at least about 50 wt %, most preferably at least about 80 wt % organic components, and may in extreme cases be substantially free from inorganic components. However, it is preferred that at least about 5 wt %, most preferably at least about 20 wt % of inorganic components are included. Such inorganic components may, for example, be inorganic ions from salts made up of both organic and inorganic ions.

The continuous liquid phase of the catholyte preferably comprises an at least partially organic salt, comprising at least one kind of organic cation and/or organic anion. The content thereof in the continuous liquid phase is preferably from about 20 wt % to about 99 wt %, more preferably from about 40 wt % to about 95 wt %, most preferably from about 60 wt % to about 90 wt %.

The continuous liquid phase of the catholyte preferably has a pH below 7. If the liquid phase is predominantly organic, the pH refers to the pH obtained in water kept in equilibrium with the predominantly organic liquid phase.

The at least partially organic salt may be selected from the group of salts referred to as ionic liquids, a diverse class of liquids substantially consisting of ions. An ionic liquid can be simple and contain a single kind of anions and a single kind of cations, or may be complex and contain a mixture of different anions and/or different cations. Some ionic liquids have a low melting point and negligible vapour pressure near or below room temperature and are often referred to as room temperature ionic liquids. Such ionic liquids usually remain liquids over a large temperature range.

The at least partially organic salt may also be selected from salts that alone are not classified as ionic liquids but have such properties when present together with a neutral co-solvent such as water or a low molecular alcohol like methanol, ethanol or propanol, of which water is preferred. The weight ratio salt to co-solvent is preferably from about 1:1 to about 1000:1, more preferably from about 2:1 to about 100:1, most preferably from about 5:1 to about 20:1.

It is preferred to use an at least partially organic salt that in itself or in combination with a neutral co-solvent forms a liquid phase at atmospheric pressure below about 130° C., preferably below about 100° C., most preferably below about 80° C. Further, the partial pressure of the salt at 100° C. is preferably below about 10 kPa, more preferably below about 1 kPa, most preferably below 0.1 kPa (excluding the partial pressure from an optional neutral co-solvent).

A liquid with suitable physical properties may comprise one or a mixture of two or more at least partially organic salts, preferably in combination with one or more neutral co-solvents, of which water is preferred. It may also comprise anions and cations that alone do not form salts with suitable properties.

The at least partially organic salt may be formed from various combinations of cations and anions, among which at least one kind of ion is organic. The ions are preferably monovalent. Examples of cations include 1-alkyl-3-methyl imidiazolium, 1-butyl-3-methyl imidazolium [BMIM], 1-ethyl-3-methyl imidazolium [EMIM], 1,2,3-trimethyl imidazolium, N-alkylpyridinium, N-butyl pyridinium [BPY], pyrrolidinium, guanidinium and alkyl guanidinium, isouronium, $PR_4^+$, $NR_4^+$, $SR_3^+$, tetramethylammonium, choline, cocomonium, and mixtures thereof, R preferably being, independently of each other, optionally substituted alkyl, alkenyl or aryl, or hydrogen. Other examples include substituted quinones here denoted [Q-$NR_3^+$] and [Q-$PR_3^+$], where Q represents a quinone such as anthraquinone, naphtoquinone or benzoquinones and R being as above. Examples of anions include hexafluorophosphate [HFP], tetrafluoroborate [TFB], fluorosulfonate, hexafluoroantimonate hexafluoroarsenate, chloroaluminate, bromoaluminate, bis(trifluoromethylsulfonyl)imide, tris(trifluoromethylsulfonyl)methide, tricyanomethide, dicyanamide, nonafluorobutanesulfonate, trifluoromethane sulfonate, 2,2,2-trifluororethanesulfonate, nitrate, sulphate, phosphate, $RPO_4^{2-}$, $R_2PO_4^-$, $R_2PO_2^-$ (e.g. a dialkylphosphinate), perchlorate, acetate, alkylsulphonate, bis(2-ethylhexyl)sodium sulfosuccinate, diethyleneglycolmonomethylethersulfate, alkyloligoethersultfate, pivalate, tetraalkylborate, propionate, succinate, saccharinate, glycolate, stearate, lactate, malate, tartrate, citrate, ascorbate, glutamate, benzoate, salicylate, methanesulfonate, toluenesulfonate, and mixtures thereof, R being as above. Other examples include substituted quinones here denoted [Q-(O)—$SO_3^-$] and [Q-(O)—$PO_3R^-$], where Q represents a quinone such as anthraquinone, naphtoquinone or benzoquinones, (O) denotes an optional oxygen (e.g. sulphate/sulphonate and phosphate/phosphonate) and R being as above.

In the case any cation or anion comprise one or more optionally substituted alkyl, alkenyl or aryl groups, it is preferred that these groups independently from each others, have from 1 to 12 carbon atoms, most preferably from 1 to 8 carbon atoms. If of more than one such group is present, they are preferably of mixed chain length. Alkyl, alkenyl and aryl groups may also be substituted, e.g. with one or more hydroxyl group.

Examples of salts useful for the present invention include any combination of the following cations; [1,3-dialkyl imidazolium], [trialkylammonium], [tetraalkylammonium], [trialkylphosphonium], [tetraalkylphosphonium], [alkylpyridinium], [choline], [Q-$NR_3^+$] and [Q-$PR_3^+$] in combination with any of the following anions; [sulphate], [phosphate], [alkyl sulphate], [alkyl sulphonate], [dialkyl phosphate], [alkyl phosphonate], [Q-(O)—$SO_3^-$] and [Q-(O)—$PO_3R^-$], where Q, (O) and R are defined as above.

Specific combinations of groups include [1,3-dialkyl imidazolium] [alkyl sulphonate] such as any one of [1-butyl-3-methyl imidazolium][methyl-$SO_3^-$], [1-ethyl-3-methyl imidazolium][ethyl sulphonate], [1-hexyl-3-methyl imidazolium][tosylate], [1-butyl-3-methyl imidazolium][antraquinone-2-sulphonate] or [1-butyl-3-methyl imidazolium][5-tert-amyl-naphtoquinone-2-sulphonate]; [tetraalkylammonium][Q-(O)—$SO_3^-$] such as any one of [methyl, triethyl ammonium], [5-tert-amyl-naphtoquinone-2-sulphonate], [methyl,di-ethyl,butyl ammonium] [anthraquinone-2-sulphonate] or [choline][5-amyl-bezonquinone-2-sulphonate]; or [Q-$NR_3^+$][alkyl sulphonate] such as [5,6,7,8-tetrahydro anthraquinone-2-aminium, N,N,N-(methyl,diethyl)][methylsulphonate]; [tetraalkylphosphonium][dialkylphosphate] such as any of [ethyl tributyl phosphonium][diethyl phosphate], [phenyl triethyl phsophonium] [diisobutyl phosphate].

Not being bound to specific combinations of groups a multitude of combinations are possible, such as any one of [triisobutyl(methyl) phosphonium][tosylate], [trihexyl(tetradecyl)phosphonium][bis 2,4,4-trimethylpentyl phosphinate] [tetrabutylammonium][methanesulhponate][1-ethyl-3-methyl imidazolium] [HFP], [tripentyl sulphonium] [dipentyl, benzyl ammonium], [benzoquinone-2-aminium-N,N,N-diethyl,phenyl][5,6,7,8-tetrahydro-9,10-antraquinone-2-sulphonate], [choline][5-ethoxy-1,4-naphtoquinone-6-sulphate], [N-propyl-pyridinium] [saccharinate].

In addition to those mentioned above, also other kinds of commercially available or otherwise known ionic liquids or salts having such properties in combination with a neutral co-solvent may be used.

It may also be possible to use a salt where at least one of the ions also function as a mediator that is reacted at the cathode to a reduced form and thus participates in the cyclic process for generation of hydrogen peroxide. In this case the mediator used may partly of fully consist of ions from such a salt. Examples include salts comprising a cation or an anion of a substituted quinone or a nicotinamide derivate such as those mentioned above.

The use of an at least partially organic salt as described above in the continuous phase of the electrolyte involves the advantages of combining high solubility of organic mediators like quinones with good electric conductivity. Another advantage is the very low flammability allowing reaction with oxygen to be carried out safely at higher oxygen concentrations and higher temperature than would be the case for conventional flammable solvents. It is also easy to separate hydrogen peroxide therefrom, for example by evaporation or extraction, and thereby obtaining hydrogen peroxide either of high purity or in a mixture with a selected compound for further processing, for example water. Another example is a methanol/hydrogen peroxide mixture for use as reagent in an epoxidation reaction. Use of ionic liquids to form a medium suitable for carrying out reactions involving hydrogen peroxide has been disclosed in B. Chhikara et al. in "Oxidation of alcohols with hydrogen peroxide catalyzed by a new imidazolium ion based phosphotungstate complex in ionic liquid", Journal of Catalysis 230 (2005, 436-439).

The catholyte further comprises one or more organic or mineral acids like formic acid, acetic acid, monochloro acetic acid, benzoic acid, sulphonic acids, phosphonic acids, nitric acid, sulphuric acid, hydrochloric acid, hydroiodic acid, hydrobromic acid, perchloric acid or phosphoric acid.

The catholyte may also comprise further components. For example, a predominantly organic continuous liquid phase may comprise a neutral co-solvent as earlier mentioned, preferably water. The amount of neutral co-solvent is preferably up to about 50 wt %, most preferably from about 1 to about 20 wt %. A particularly preferred content of neutral co-solvent may, for example, be from about 1 to about 5 wt % or from about 5 to about 10 wt %. Examples of other optional additives include hydrogen peroxide stabilisers, emulsifiers, corrosion inhibitors, anti-foaming agents, buffers, conductivity enhancers, viscosity reducers, etc. Examples of hydrogen peroxide stabilisers include those commonly used such as phosphoric acid, phosphonic acid based complexing agents, protective colloids like alkali metal stannate and radical scavengers like pyridine carboxylic acids. Examples of phosphonic acid based complexing agents include 1-hydroxyethylidene-1,1-diphosphonic acid, 1-aminoethane-1,1-diphosphonic acid, aminotri (methylenephosphonic acid), ethylene diamine tetra (methylenephosphonic acid), hexamethylene diamine tetra (methylenephosphonic acid), diethylenetriamine penta (methylenephosphonic acid), diethylenetriamine hexa (methylenephosphonic acid), 1-aminoalkane-1,1-diphosphonic acids (such as morpholinomethane diphosphonic acid, N,N-dimethyl aminodimethyl diphosphonic acid, aminomethyl diphosphonic acid), reaction products and salts thereof, preferably sodium salts.

It is preferred that a predominantly organic liquid phase in the catholyte has a viscosity at operating conditions below about 100 mPas, more preferably below about 30 mPas, and most preferably below about 10 mPas. Furthermore, due to the inherent risks of handling substantially pure hydrogen peroxide, the product recovered is preferably a mixture of hydrogen peroxide with water or low molecular alcohols, for example methanol. The partial pressure at 100° C. of liquid components that do not form part of the product mixture should preferably be below about 10 kPa, more preferably below about 1 kPa, most preferably below 0.1 kPa.

The electrochemical cell may comprise only one compartment for the anode and one for the cathode or further comprise one or several compartments in-between, for example an electrodialysis stack enabling any known electrodialysis to be performed. The means for separating the compartments may be a non-selective physical barrier, e.g. a porous membrane or diaphragm, or it may be selectively permeable for certain species such as cations or anions. Also a combination of membranes may be used, such as bipolar membranes enabling splitting of water to protons and hydroxide ions. Non-selective barriers may, for example, be made from asbestos, ceramics, glass, polyolefines, PTFE, PVC, etc. Cation selective membranes may, for example, be made from organic polymers such as PTFE, polystyrene, styrene/divinylbenzene or vinylpyridine/divinylbenzene modified with acid groups like sulphonate, carboxylate or phosphonate. Anion selective membranes may, for example, be made from organic polymers such as PTFE, polystyrene, styrene/divinylbenzene or vinylpyridine/divinylbenzene modified with basic groups like quaternary ammonium. A bipolar membranes may comprise an anion permeable membrane and a cation permeable membrane laminated together, optionally with a catalyst layer in-between. Ion selective and bipolar membranes are commercially available, for example under the trademarks Nafion™, Flemium™, Neosepta bipolar®.

The electrolyte in the cathode compartment may contain one, two or more liquid phases. In a single liquid phase system there is only a predominantly organic or a predominantly aqueous liquid electrolyte phase. In a system with two liquid phases, the non-continuous phase may be emulsified or simply mixed into the continuous liquid phase. If there are more than a single liquid phase, the components in the electrolyte will be distributed between the phases depending on their solubility properties. In addition to the liquid phase or phases there may also be gas and/or solids present.

In the cathode compartment the temperature and the pressure may be the same or different from the anode compartment and are preferably set so the catholyte is liquid. A high temperature favours low viscosity, high electrical conductivity and high mass transfer rates, while a low temperature favours the stability of hydrogen peroxide and components in the electrolyte. Normally the temperature is preferably from about 0 to about 200° C., more preferably from about 40 to about 150° C., most preferably from about 60 to about 100° C. The pressure is preferably from about 10 to about 30000 kPa, more preferably from about 80 to about 2000 kPa, most preferably from about 100 to about 800 kPa.

The reaction of the one or more reduced forms of the mediator and oxygen to yield hydrogen peroxide may take place inside the cell or in a separate vessel or as a combination of the two, usually resulting in formation of hydrogen peroxide in the catholyte and reformation of the mediator to take part in another reaction cycle. Normally molecular oxygen is added to the electrolyte comprising reduced mediator, but part of it may come from oxygen generated in anodic reactions and transported through the electrolyte in the cell, optionally via a membrane, or be isolated as a separate stream and reintroduced into the cell. Molecular oxygen may be added dissolved in a liquid or in the form of any oxygen containing gas such as air, oxygen enriched air or substantially pure oxygen. Adding at least part of the oxygen as a gas directly into the cell involves the advantage of improving the agitation and may also create a gas-lift for transporting electrolyte out of cell, alternatively contribute to stripping of hydrogen peroxide from the electrolyte. Adding oxygen directly to the cell may enable the full catalytic cycle of the mediator to be completed inside the cell, substantially eliminating the need for withdrawing a stream comprising a reduced form of the mediator and feeding a stream comprising a mediator. The reactions to yield hydrogen peroxide are facilitated by the presence of protons that may originate from any available source, such as water, hydroquinone, protons generated at the anode or any acid that has been added to the electrolyte. If the reaction with oxygen takes place in a separate vessel, the conditions like temperature, pressure etc. may be the same or different from what is prevailing in the cell. The temperature is preferably from ambient, e.g. about 20° C., to an upper limit determined either by the flammability of the solvent or the stability of the hydrogen peroxide, for example up to about 70° C. The pressure is preferably from about atmospheric up to about 5 barg. Generally it is preferred to use a bubble column, either packed or with sieve plates. Preferably oxygen containing gas is fed at the bottom and the liquid flows either upwards or downwards.

Various methods may be used for separating hydrogen peroxide from the electrolyte, such as evaporation, extraction or membrane-based technologies. The separation may take place in the cell, in separate equipment from which the remaining electrolyte then is recycled back to the cell, or a combination thereof.

In one embodiment hydrogen peroxide is evaporated from a predominantly organic phase of the electrolyte, preferably together with water and optionally other volatile substances that might be present. The evaporation may be effected directly from the cell or from a separate vessel, for example, by stripping with any gas, e.g. oxygen, air or nitrogen, or by distillation at atmospheric or sub-atmospheric pressure. A low vapour pressure of the at least partially organic salt and other organic species optionally present in the electrolyte and not forming part of the desired product mixture facilitates the use of evaporation techniques for separating hydrogen peroxide. In this embodiment is possible to obtain a hydrogen peroxide containing product stream of high purity without extensive purification steps.

In another embodiment hydrogen peroxide is extracted from a predominantly organic liquid phase by any suitable solvent such as water or methanol. All commonly used extraction technologies may be used, such as one or several mixer-settlers, sieve-plate columns, packed bed columns. If an electrolyte also comprising a predominantly aqueous phase is used, hydrogen peroxide will automatically be enriched in that phase, which may be withdrawn as a product, alternatively be subjected to distillation or other kind of purification and recycled back to the cell.

In a further embodiment membrane based separation is used. Examples of such processes include membrane extraction, pervaporation and nanofiltration.

In still another embodiment the mediator and its reduced forms are dissolved in a predominantly aqueous phase. If also the oxidation of the reduced forms of the mediator takes place in the predominantly aqueous phase the hydrogen peroxide may be separated by e.g. distillation. Another option is to keep the predominantly aqueous phase substantially free from oxygen and separate, e.g. by extraction, the reduced forms of the mediator to a predominantly organic phase and then effect the oxidation.

In still a further embodiment hydrogen peroxide is not withdrawn from the electrolyte but is used directly as a reactant in the production of other chemicals. Electrolyte remaining after such reactions may then be recycled to the cell.

The production of hydrogen peroxide is preferably operated continuously, either with electrolyte flowing through the cell or by continuously separating hydrogen peroxide from the electrolyte in the cell. It is preferred to serve for adequate agitation, particularly around the cathode, for example by gas blow, mechanical agitation, circulation of electrolyte, or combinations thereof. Gas blow is preferably done with oxygen or oxygen containing gas such as air. In a cell with an essentially vertical flow, gas blowing may also creates a gas-lift enhancing the transport of electrolyte through the cell alternatively stripping of hydrogen peroxide, optionally together with water or any other component that is volatile at the temperature and pressure of operation.

In order to avoid detrimental accumulation of impurities from feed chemicals or degradation products formed in side reactions it may in some cases be advisable to bleed off part of the electrolyte from the system and/or purifying with various methods like electrodialysis, adsorbtion, recrystallization, precipitation, washing, ion-exchange, evaporation or stripping using a carrier gas, reactive regeneration with acid/base or reductive/oxidative steps.

As hydrogen gas may be formed as a side reaction on the cathode it may be appropriate to include a gas analyzer and a device for flushing with inert gas.

The temperature may be controlled by any suitable means, e.g. by heat exchangers at any appropriate flow. Cooling can also be effected by evaporation, e.g. in the electrochemical cell, and subsequent condensation of the vapour. If evaporative cooling is effected by water it may be appropriate to add water specifically for this purpose.

The anode can be made of any suitable material, e.g. titanium titanium alloy. The anode is preferably coated with e.g. $RuO_2/TiO_2$, $RuO_2/TiO_2/IrO_2$ or Pt/Ir. Particularly preferred anodes are DSA™ (dimension stable anode).

Various kinds of cathodes may be used. It is preferred that the cathode is made of a material suppressing parasitic reactions like hydrogen evolution, direct oxygen reduction to water and destruction of the organic mediator, the ionic liquid or the hydrogen peroxide formed. In most cases it is preferred to use a cathode with a hydrophobic surface. Examples of materials for the cathode include carbon based materials like boron doped diamond, graphite, glassy carbon, highly oriented pyrolytic graphite, reticulated carbon and conductive polymers. Examples of conductive polymers include poly (para)phenylene, polypyrrole, polythiophene and polyaniline. The conductive polymer can be applied as a thin film, with a preferred thickness from about 0.1 to about 100 µm, on any suitable substrate, such as Pt or stainless steel. The polymer film can be prepared by chemical synthesis or preferably by electrosynthesis. A specific example is a cathode obtained electrosynthesis of a polypyrrole film on stainless steel. Other examples cathode materials Include metals like iron, steel, lead, nickel, titanium or platinum, or conductive metal oxides such as $PbO_2$, $NiO_2$, $Ti_4O_7$, $NiCo_2O_4$ or $RuO_2$. Still further examples include electrocatalytic cathodes of a material like titanium or titanium alloy coated, fully or partially, with particles of noble metals like gold, platinum, palladium or grafted with catalysts for anthraquinones.

The cathode and the anode can be made in various geometrical shapes and may, for example, take the form of a flat sheet or plate, a curved surface, a convoluted surface, a punched plate, a woven wire screen, an expanded mesh sheet, a rod, or a tube. However, the anode and cathode preferably have a planar shape, most preferably in the form of a sheet, mesh or plate.

Any conventional cell design can be used, preferably with as short distance as possible between the anode and cathode. A divided cell may, for example, be of the "zero gap" type where at least one of the electrodes is pressed against a membrane dividing the cell.

A typical production plant includes a multitude of cells to achieve the desired production rate. The cells can be arranged in a monopolar or bipolar way in an electrolyser according to any conventional design.

Figure 1:
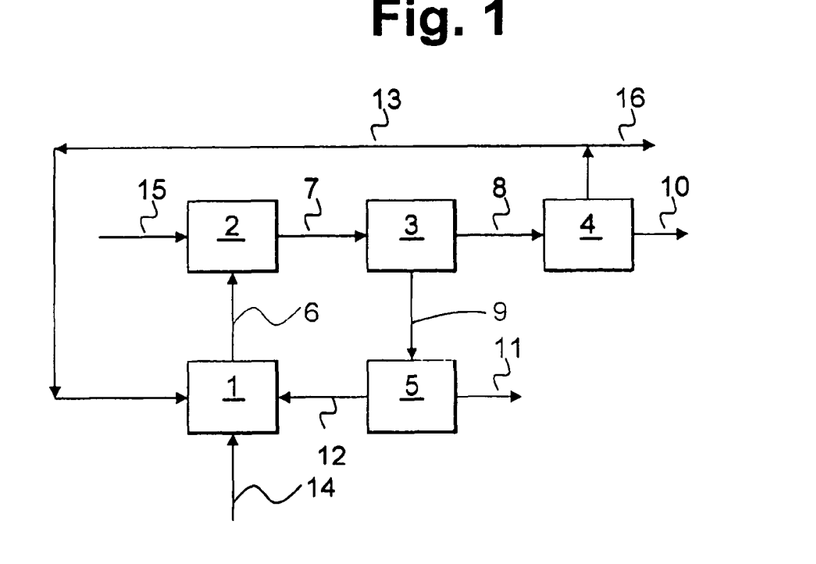
FIG. 1 is a schematic of a cathodic process.
Figure 3:
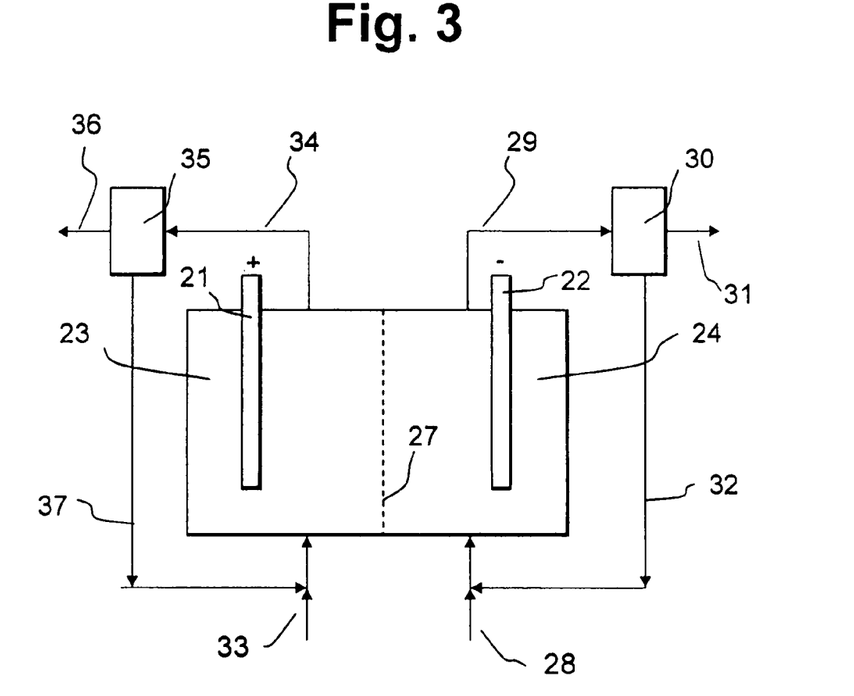
FIG. 3 is a schematic of another embodiment of an electrolytic cell of the invention.
Figure 4:
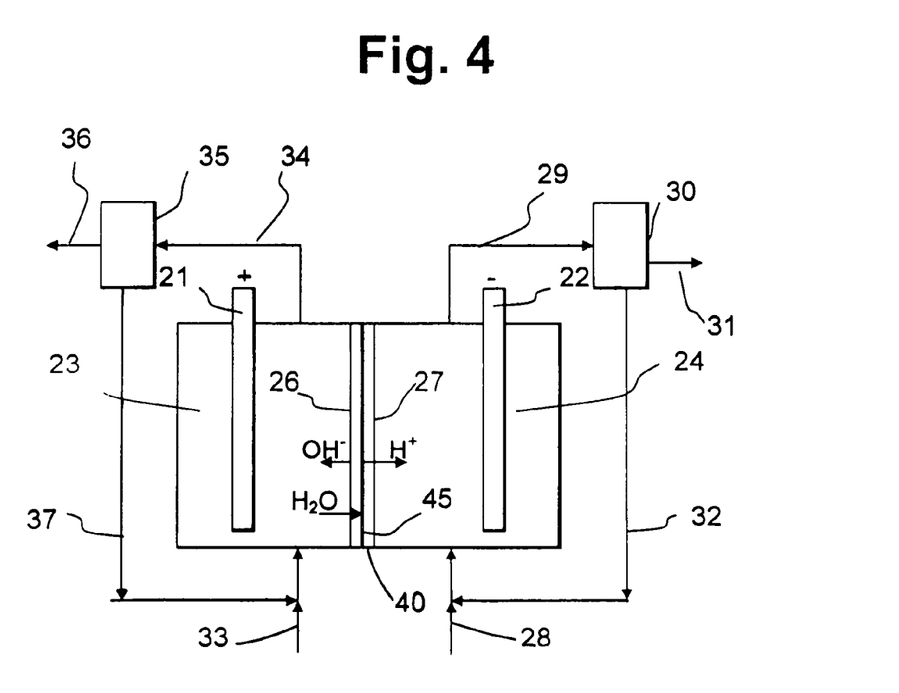
FIG. 4 is a schematic of yet another embodiment of an electrolytic cell of the invention.

Some embodiments of the invention will now be further described in connection with the appended schematic drawings. However, the scope of the invention is not limited to these embodiments. FIG. 1 shows a schematic configuration of the cathodic process part, while FIGS. 2, 3 and 4 show schematic designs of various electrochemical cells.

Referring to FIG. 1, an electrochemical reduction of the mediator takes place in a predominantly organic continuous phase of an electrolyte in a cell compartment 1, that may be a cathode compartment or a single compartment cell. A feed stream 14 provides the cell compartment 1 with any substances that are consumed in the process, such as oxygen, or withdrawn in any product stream not recycled, such as water or an inert gas like nitrogen. If oxygen is present a reaction between the reduced form or forms of the mediator and oxygen to hydrogen peroxide or alkali metal peroxide may also take place in the cell compartment 1. If this reaction proceeds to a sufficiently large extent it is sufficient to remove the hydrogen peroxide together with e.g. water in a stream 6. If the reaction to hydrogen peroxide or alkali metal peroxide is incomplete electrolyte is withdrawn and the reaction completed to the extent desired in an oxidation reactor 2 where additional oxygen 15 may be supplied. A resulting stream 7 contains hydrogen peroxide or an alkali metal peroxide in one or several forms depending on the conditions used, for example as a vapour or dissolved in a liquid phase. If both a gas and at least one liquid phase is present they are brought to a gas liquid separator 3 from which a gas stream 8 is brought to a condenser 4. Hydrogen peroxide product 10 is withdrawn from the condenser 4 while remaining gas 13, e.g. oxygen, steam and other optional components, is either recycled to any point where oxygen can be used, such as the cell compartment 1 or the oxidation reactor 2, or bleed off via 16. A liquid stream 9 from the separator 3 is recycled to the cell compartment 1. If the liquid stream 9 contains hydrogen peroxide it is first brought to a separator 5, which, for example, may be an extraction unit or a membrane separation unit. Here the stream 5 is separated into a hydrogen peroxide containing product stream 11 and a recycle stream 12 comprising the predominantly organic electrolyte.

The various units illustrated in FIG. 1 can be combined in a multitude of ways. For example, oxygen may be introduced in the cell compartment 1 in various ways, for example separately or together with any liquid feed or recycled stream. Oxygen may also be introduced at a position above the electrodes in order to separate the electrochemical reactions and the oxidation. The oxidation reactor 2 and the gas liquid separator 3 may be combined, for example by using a bubble column. If the operation conditions are set so no gas forms and only a liquid phase is withdrawn from the cell compartment 1, the gas liquid separator 3 and the condenser 4 may be omitted.

Figure 2:
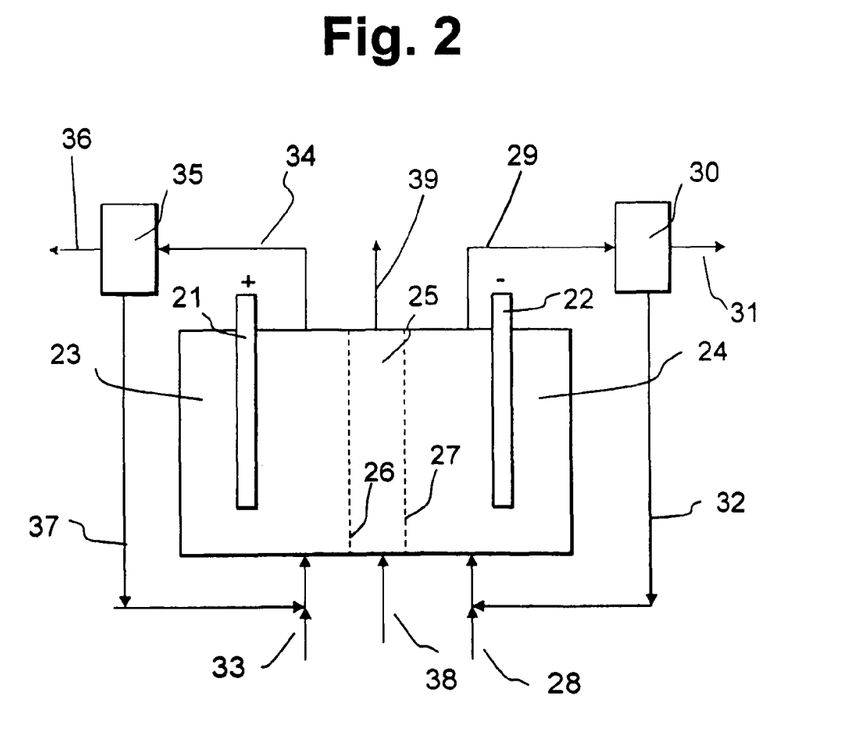
FIG. 2 is a schematic of one embodiment of an electrolytic cell of the invention.

Referring to FIG. 2, an electrochemical cell operated according to the invention comprises an anode 21 in an anode compartment 23 and a cathode 22 in a cathode compartment 24. The cell also comprises a middle compartment 25 separated from the anode and cathode compartments 23, 24 by ion selective membranes 26, 27. In one embodiment, the membrane 26 is anion permeable and the membrane 27 is cation permeable. In another embodiment both membranes 26, 27 are cation permeable. The cathode compartment 24 holds a catholyte comprising an organic mediator according to the invention. Oxygen containing gas is fed through inlet stream 28 to the cathode compartment 24 and an outlet stream 29 comprising hydrogen peroxide and/or reduced mediator is brought to a unit 30 where further processing takes place. Such further processing may include oxidation of reduced mediator to obtain hydrogen peroxide and separation thereof, resulting in a product stream 31 comprising hydrogen peroxide and optionally other species, such as water that may remain in the final product and others that may be separated later, and a recycle stream 32 comprising e.g. catholyte with an organic mediator obtained by oxidation of the reduced forms thereof. The anode compartment 23 is fed with an inlet stream 33 that may have various compositions depending on the desired reactions. Anolyte, including reaction products, are withdrawn in an outlet stream 34 to a product separator 35 from which a product 36 is withdrawn and remaining electrolyte 37 recycled to the anode compartment 23. The middle compartment 25 is fed through an inlet stream 38 with a preferably aqueous solution, the composition of which depends on the desired overall reactions. An outlet stream 39 from the middle compartment 25 may be recycled or used in any other way.

If the cell of FIG. 2 is used in an embodiment where the membrane 26 is anion selective, the membrane 27 is cation selective and chloride is reacted at the anode to form chlorine that may be hydrolysed further to form hypochlorous acid and finally chlorate, the anolyte is preferably an aqueous solution comprising NaCl, NaClO$_3$, or the corresponding potassium salts KCl or KClO$_3$, and optionally a buffer such as chromate, dichromate or any other suitable salt. A product stream 34 of anolyte is withdrawn and brought to product separator 35 where alkali metal chlorate is crystallised and withdrawn 36 while remaining electrolyte is recycled 37 to the anode compartment 23. It is also possible to provide a unit (not shown), e.g. a chlorate reactor, for further reactions to form chlorate by disproportionation of hypochlorous acid in the withdrawn product stream 34 before the crystallisation. In one option the middle compartment 39 is preferably fed through inlet stream 38 with a solvent like water containing HCl or NaCl and chloride ions are transferred through the anion selective membrane 26 to the anode compartment 23 where they are consumed at the anode 21 to form chlorine in a first step. Then Na$^+$ or K$^+$ are fed to the cathode compartment 23 through inlet stream 33 for example in the form of NaOH or KOH. In another option the middle compartment 25 is fed through inlet stream 38 with OH$^-$, for example as NaOH or KOH, the hydroxide ions will be transferred through the anion selective membrane 26 and chloride ions are then fed through inlet stream 33, for example as NaCl. In either option cations, normally Na$^+$ or H$^+$, are transferred from the middle compartment 25 through the cation selective membrane 27 into the cathode compartment 24.

Referring to FIG. 3, an electrochemical cell operated according to the invention comprises an anode 21 in an anode compartment 23 and a cathode 22 in a cathode compartment 24. However, in contrast to the cell of FIG. 2 there is only one ion selective membrane 27, which preferably is cation selective, and there is no middle compartment. In all other aspects the cell is identical to the one of FIG. 2, the description of which is referred to.

If the cell in FIG. 3 is provided with a cation selective membrane 27 and is used in an embodiment where chloride reacts at the anode 21 to form chlorine that is hydrolyzed further to form chlorate, the anolyte is preferably an aqueous solution comprising NaCl, NaClO$_3$, or the corresponding potassium salts KCl or KClO$_3$, and a buffer such as chromate, dichromate or any other suitable salt. NaCl or KCl is fed to the anode compartment 23 through inlet stream 33 while cations such as Na$^+$ or H$^+$ are transferred through the membrane 27 into the cathode compartment 24. In order to compensate for loss of Na$^+$ or K$^+$ through the membrane 27 and neutralising H$^+$ formed in the anodic reactions it may be appropriate to add some NaOH or KOH at any suitable position, e.g. to the inlet stream 33 or the recycle stream 37. In all other aspects, like the handling of product 34 and recycle streams 37, the operation is equivalent to the corresponding embodiment performed in the cell of FIG. 2, the description of which is referred to.

Referring to FIG. 4 an electrochemical cell operated according to the invention comprises an anode 21 in an anode compartment 23 and a cathode 22 in a cathode compartment 24. However, in contrast to the cell of FIG. 2, the middle compartment is replaced by a bipolar membrane 40 separating the cell compartments 23, 24. The bipolar membrane 40 comprises an anion selective membrane 26 and a cation selective membrane 27 laminated together on each side of a catalyst layer 45. Water from the anolyte pass into the catalyst layer where it is split to protons passing into the cathode compartment 24 and hydroxide ions passing into the anode compartment 23. In all other aspects the cell is identical to those of FIGS. 2 and 3, the descriptions of which are referred to.

If the cell of FIG. 4 is used in an embodiment where chloride reacts at the anode 21 to form chlorine that is reacted further to form chlorate, the anolyte is preferably an aqueous solution comprising NaCl, NaClO$_3$, or the corresponding potassium salts KCl or KClO$_3$, and a buffer such as chromate, dichromate or any other suitable salt. NaCl or KCl is fed to the anode compartment 23 through inlet stream 33. Inside the bipolar membrane water is split into protons and hydroxide ions. The protons move into the cathode compartment 24 and facilitates the oxidation of reduced mediator to form hydrogen peroxide, while the hydroxide ions move into the anode compartment 23 facilitating the hydrolysis of chlorine. In all other aspects, like the handling of product 34 and recycle streams 37, the operation is equivalent to the corresponding embodiment performed in the cell of FIG. 2, the description of which is referred to.

In all the embodiments described in FIGS. 2-4 the cathodic process may be the same, i.e. reduction of the mediator at the cathode 22 and transfer of cations like H$^+$ or Na$^+$ from the middle compartment 25 or the anode compartment 23 through the cation selective membrane 27.

The invention will now be further described through the following Example. If not otherwise stated, all parts and percentages refer to parts and percent by weight.

EXAMPLE

A solution containing 50 ml of the ionic liquid 1-butyl-3-methyl-imidazolium hexaflourophosphate [BMIM] [HFP] with 0.8 g 2-ethyl-9,10-anthraquinone (EAQ) was poured into the cathode compartment of a small reactor. Nitrogen gas saturated with water was purged into the solution for 30 minutes to dissolve gases in the solution and to saturate the solution with water to an estimated content of about 3-5 wt %. On top of the organic phase an aqueous phase of 40 ml 0.5 M H$_2$SO$_4$ was added to supply protons. A cathode of circular platinum mesh with a diameter of 3 cm was placed in the organic phase and a platinum mesh anode was placed in a separate compartment containing 10 mM NaOH aqueous solution. The anode and cathode compartments were separated with a non-selective ceramic membrane (diaphragm). The catholyte was stirred by a magnetic bar located in the organic phase in the cathode compartment. To keep track of the cathodic potential a Calomel reference electrode was placed in the cathode compartment close to the cathode. The anode compartment contained an aqueous solution of 150 g/l NaCl and 10 g/l sodium dichromate. At a temperature of 68° C. a current of 0.2 A was placed between the anode and cathode. During the experiment a few droplets of NaOH (1M) was added to the anolyte to keep the pH between 6 and 7. In the cathode compartment hydrogen peroxide was generated. In the anode compartment chloride was oxidized to chlorine which eventually formed chlorate. After 20 minutes the experiment was terminated and a current efficiency for chlorate formation was calculated to 59%.

The invention claimed is:

1. Process for the production of alkali metal chlorate comprising:
    providing an electrochemical cell comprising an anode and a cathode in separate anode and cathode compartments;
    contacting the cathode with an electrolyte comprising at least one organic mediator and one or more organic or mineral acids;
    reacting the organic mediator at the cathode to form at least one reduced form of the mediator;
    reacting the at least one reduced form of the mediator with oxygen to form hydrogen peroxide;
    contacting the anode with an anolyte comprising alkali metal chloride;
    reacting chloride at the anode to form chlorine that is hydrolyzed; and,
    reacting the hydrolyzed chlorine to form chlorate,
wherein the electrolyte is a continuous liquid phase further comprising from about 20 wt % to about 99 wt % of an at least partially organic salt, comprising at least one kind of organic cation and/or organic anion.

2. Process as claimed in claim 1, wherein the concentration of chloride ions in the anolyte is from about 30 to about 300 g/l, calculated as sodium chloride.

3. Process as claimed in claim 1, wherein the pH in the bulk of the anolyte is from about 4 to about 10.

4. Process as claimed in claim 1, wherein the electrochemical cell comprises at least one compartment between the anode- and cathode compartments.

5. Process as claimed in claim 1, wherein the organic mediator is selected from the group consisting of quinones, flavoquinones, pyridine derivates, and ketones.

6. Process as claimed in claim 5, wherein the organic mediator is selected from the group consisting of quinones containing a (benzo)quinone-moiety.

7. Process as claimed in claim 6, wherein the organic mediator is selected from the group consisting of anthraquinones, tetrahydro anthraquinones, naphtoquinones, benzoquinones and derivates thereof.

8. Process as claimed in claim 1, wherein the content of organic mediator, including the reduced forms, in the catholyte is at least about 1 wt %.

9. Process as claimed in claim 1, wherein the content of the at least partially organic salt in the catholyte is from about 40 wt % to about 95 wt %.

10. Process as claimed in claim 1, wherein the at least partially organic salt is present together with a neutral co-solvent and the weight ratio salt to co-solvent is from about 1:1 to about 1000:1.

11. Process as claimed in claim 1, wherein a neutral co-solvent is present in the catholyte in an amount up to about 50 wt %.

12. Process as claimed in claim 1, wherein the at least partially organic salt that in itself or in combination with a neutral co-solvent forms a liquid phase at atmospheric pressure below about 130° C.

13. Process as claimed in claim 1, wherein the at least partially organic salt at 100° C. has a partial pressure below about 10 kPa.

14. Process as claimed in claim 1, wherein the at least partially organic salt comprises a cation selected from the group consisting of 1-alkyl-3-methyl imidiazolium, 1-butyl-3-methyl imidazolium [BMIM], 1-ethyl-3-methyl imidazolium [EMIM], 1,2,3-trimethyl imidazolium, N-alkylpyridinium, N-butyl pyridinium [BPY], pyrrolidinium, guanidinium and alkyl guanidinium, isouronium, $PR_4^+$, $NR_4^+$, $SR_3^+$, tetramethylammonium, choline, cocomonium, and mixtures thereof, R being, independently of each other, optionally substituted alkyl, alkenyl or aryl, or hydrogen.

15. Process as claimed in claim 1, wherein the at least partially organic salt comprises a cation selected from the group consisting of substituted quinones.

16. Process as claimed in claim 1, wherein the at least partially organic salt comprises an anion selected from the group consisting of hexafluorophosphate [HFP], tetrafluoroborate [TFB], fluorosulfonate, hexafluoroantimonate hexafluoroarsenate, chloroaluminate, bromoaluminate, bis(trifluoromethylsulfonyl)imide, tris(trifluoromethylsulfonyl)methide, tricyanomethide, dicyanamide, nonafluorobutanesulfonate, trifluoromethane sulfonate, 2,2,2-trifluororethanesulfonate, nitrate, sulphate, phosphate, $RPO_4^{2-}$, $R_2PO_4^-$, $R_2PO_2^-$ (e.g. a dialkylphosphinate), perchlorate, actetate, alkylsulphonate, bis(2-ethylhexyl)sodium sulfosuccinate, diethyleneglycolmonomethylethersulfate, alkyloligoethersultfate, pivalate, tetraalkylborate, propionate, succinate, saccharinate, glycolate, stearate, lactate, malate, tartrate, citrate, ascorbate, glutamate, benzoate, salicylate, methanesulfonate, toluenesulfonate, and mixtures thereof, R being, independently of each other, optionally substituted alkyl, alkenyl or aryl, or hydrogen.

17. Process as claimed in claim 1, wherein the at least partially organic salt comprises an anion selected from the group consisting of substituted quinones.

18. Process as claimed in claim 1, wherein the at least partially organic salt comprises a cation selected from the group consisting of [1,3-dialkyl imidazolium], [trialkylammonium], [tetraalkylammonium], [trialkylphosphonium], [tetraalkylphosphonium], [alkylpyridinium], [choline], [Q-NR$_3^+$] and [Q-PR$_3^+$] and an anion selected from the group consisting of [sulphate], [phosphate], [alkyl sulphate], [alkyl sulphonate], [dialkyl phosphate], [alkyl phosphonate], [Q-(O)—SO$_3^-$] and [Q-(O)—PO$_3$R$^-$], where Q is a quinone, (O) is an optional oxygen and R is, independently of each other, optionally substituted alkyl, alkenyl or aryl, or hydrogen.

* * * * *